United States Patent [19]

Jeskey

[11] Patent Number: 4,591,232
[45] Date of Patent: May 27, 1986

[54] OPTICAL DISPLAY SCREEN UTILIZING LIGHT-ABSORBING FIBERS

[75] Inventor: Richard V. Jeskey, Fiskdale, Mass.

[73] Assignee: Incom, Inc., Southbridge, Mass.

[21] Appl. No.: 500,623

[22] Filed: Jun. 3, 1983

[51] Int. Cl.$^4$ .............................................. G02B 6/08
[52] U.S. Cl. ................................ 350/96.27; 350/96.24
[58] Field of Search ................ 350/96.1, 96.24, 96.25, 350/96.26, 96.27, 96.28, 96.15

[56] References Cited

U.S. PATENT DOCUMENTS

| | | | |
|---|---|---|---|
| Re. 28,630 | 11/1975 | Hamann | 358/83 |
| 2,825,260 | 3/1958 | O'Brien | 350/96.25 |
| 2,979,632 | 4/1961 | MacNeille | 313/475 |
| 2,983,835 | 5/1961 | Rey, Jr. | 313/475 |
| 2,985,784 | 5/1961 | MacNeille | 313/475 |
| 2,996,634 | 8/1961 | Woodcock | 313/470 |
| 3,195,219 | 7/1965 | Woodcock et al. | 350/96.27 |
| 3,237,039 | 2/1966 | Fyler | 350/96.27 |
| 3,279,903 | 10/1966 | Siegmund | 350/96.29 |
| 3,469,026 | 9/1969 | Winik et al. | 358/87 |
| 3,544,715 | 12/1970 | Herriott et al. | 358/85 |
| 3,703,660 | 11/1972 | Fyler | 313/475 |
| 3,840,701 | 10/1974 | Tomlin | 358/286 |
| 4,085,420 | 4/1978 | Stukenbrock | 358/56 |
| 4,141,641 | 2/1979 | Nagai | 355/1 |

OTHER PUBLICATIONS

Rancourt, "Anti-Halo Coatings for CRT Faceplates" S.I.D. (Society for Information Display) 83 Digest, 1983, pp. 22,23.

Primary Examiner—John Lee
Assistant Examiner—Lester Rushin, III
Attorney, Agent, or Firm—Blodgett & Blodgett

[57] ABSTRACT

An optical display screen reduces image diffusion and extraneous images by the selective absorption of light rays oblique to the line of sight of an operator. Light-absorbing fibers such as black glass are embedded in the screen, parallel with the line of sight, and extending either completely through the screen, or through a thinner layer laminated to the screen. A conventional light emitting layer, such as a phosphor layer is provided. Oblique components of the phosphor emission are absorbed by the fibers. Sufficiently oblique external rays are also so absorbed, and prevented from creating extraneous images. The line of sight components of the phosphor emission are passed through the screen undiminished. Methods of forming the screen include the steps of forming a bundle of unclad clear fibers, including a small percentage of light-absorbing fibers, and fusing the bundle into a block containing parallel light-absorbing fibers.

21 Claims, 6 Drawing Figures

OPTICAL DISPLAY SCREEN UTILIZING LIGHT-ABSORBING FIBERS

BACKGROUND OF THE INVENTION

Sophisticated electronic information display devices are no longer the exclusive domain of engineers and scientists. The cathode ray tube and related optical display devices are now the almost universal accompaniment to the increasingly widespread data processing devices appearing in all areas of business and society.

Along with the relatively predictable economic impact of these display devices and their direct effects on the nature of data oriented work, there also has arisen some less well anticipated ergonomic dilemmas.

A particular example of this latter problem of human and machine interaction is the difficult matter of image contrast and resolution. For various reasons, the most common optical image display devices tend to produce a rather diffuse image. The devices are presently being used for long hours by a population with widely differing levels of visual acuity. They are also being used under various conditions of ambient light, including bright lights which produce extraneous images by reflection. Thus, the likelihood of visual fatigue sharpens the need for high contrast, high resolution screens with minimal distracting extraneous images.

Specifically, the visual sharpness of a typical cathode ray tube with a phosphor-backed screen is limited, among other things, by:

1. The inherently multi-directional nature of phosphor emission, combined with a refraction at the surface of the screen,
2. Halation or "ballooning" that results from off-angle light reflected from inside the screen,
3. External light reflecting from differentially refractive interfaces within the screen,
4. External light reflecting from the conductive metal coating, usually aluminum, on the inside of the screen, and
5. External light reaching the phosphor layer with the energy and frequency to excite a superfluous emission.

Prior display screen faceplates have addressed one or more of these; often with unacceptable trade-off disadvantages. Surface etching or frosting to reduce halation brings its own inherent diffusion to the image. Neutral density filters, while diminuating off angle rays, reduce the intensity of the highly desirable rectilinear, or normal, portion of the phosphor emission as well. A bandpass filter eliminates full spectrum color as a display option. The costly optical coatings which are used to reduce reflection and re-emission of external light are highly dependent for their effectiveness on the wave length and angle of entry of the external light. Light absorbing "louvres" or "venetian blinds" present an asymmetry in their effect with the angle of view, the image darkening more quickly with either a horizontal or a vertical change in the angle of viewing. Such devices, moreover, present costly manufacturing difficulties.

One of the most successful of the prior strategies for image enhancement in highly critical display applications has been the fiber-optic faceplate. Aside from the prohibitive cost for ordinary applications and the manufacturing complexity of this approach, a number of other problems have appeared. For example, since the optical fibers must be clad in a material having a different index of refraction from the core, there exist throughout the faceplate corresponding sharp gradients in the coefficient of thermal expansion, and a general difference from standard glass with regard to this property. Such screens are subjected, during manufacture and during use, to sometimes rapidly fluctuating, high amplitude variations in temperature. If such a screen consists of a faceplate laminated to an ordinary glass screen, a failure of the lamination can occur due to differential expansions and contraction. This may also lead to a failure of the integrity of the screen with regard to hard vacuum and resistance to high voltages common in such applications.

These and other difficulties experienced with the prior art devices have been obviated in a novel manner by the present invention.

It is, therefore, an outstanding object of the invention to provide an optical display screen which heightens the contrast and resolution of an optical display.

Another object of this invention is the provision of an optical display screen which acts as an oblique light filter for both internal and external light.

A further object of the present invention is the provision of an optical display screen which diminishes the inherent oblique components of phosphor emissions.

It is another object of the instant invention to provide an optical display screen which limits internal reflection and the attendant halation and does not increase surface diffusion.

A still further object of the invention is the provision of an optical display screen which has a highly symmetrical response to the angle of view.

It is a further object of the invention to provide an optical display screen which has no diminuating affect on near normal components of phosphor emission.

It is a still further object of the present invention to provide an optical display screen which allows full spectrum color display.

Another object of the invention is the provision of an optical display screen having dependable resistance to delamination and to vacuum and high voltage leakage.

Another object of the invention is the provision of an optical display screen which is simple and integral in construction, less expensive to manufacture than the alternatives, and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the invention consists of an optical display screen having a controllable light-emitting source on one side and parallel light absorbing fibers embedded uniformly and randomly in the screen to filter out light which is propagating more than a small angle off the parallel to the axes of the fibers.

More specifically, a layer of uniformly transparent material in the form of an optical display screen is provided with a plate-like matrix fused to the inner surface, formed of the same material as the thick layer, except that the inner layer is provided with light-absorbing fibers of higher index of refraction than the material of the two layers, the fibers embedded normally to the plane of the screen. The screen is provided with a further inner layer which can be controllably induced to emit light, such as a conventional phosphor layer with a conductive metal backing.

A modification consists of a screen-shaped matrix of optically transparent material with a light source, such as the conventional phosphor layer, on the inner surface. Parallel light-absorbing fibers with index of refraction greater than the matrix material extend from the phosphor layer substantially all the way to the outer surface and are directed normally to the surfaces.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
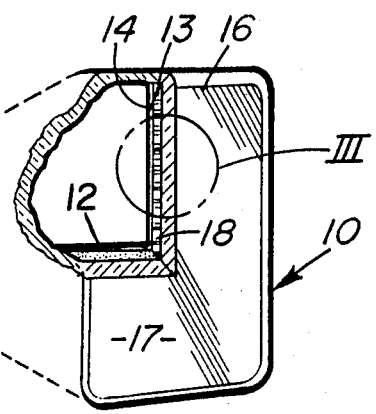
FIG. 1 shows, in perspective and partially cut-away, a cathode ray tube having a display screen embodying the present invention.

The general features of the invention are best shown in FIG. 1, wherein an optical display screen embodying the present invention is referred to generally by the numeral 10. The screen is installed in a cathode ray tube, indicated generally by the numeral 11, by means of a vacuum-tight seal, as by fusing. On the inner surface 12 of the screen is a light-emitting layer 13 and conductive metal backing 14, such as the conventional layer of phosphor compound with an aluminum backing. The layer 13 emits light on excitation by a focused, energetic electron beam from a cathode source (not shown). The rest of the screen consists of two layers of glass, an inner matrix 15 and a thicker outer layer 16 of standard glass with outer surface 17. Light-absorbing fibers 18 are embedded in the screen in the inner matrix of transparent glass 15, the fibers aligned perpendicular or normal to the phosphor layer 13. Thus, the fibers are aligned with the line of sight of an operator in normal viewing position.

Figure 2:
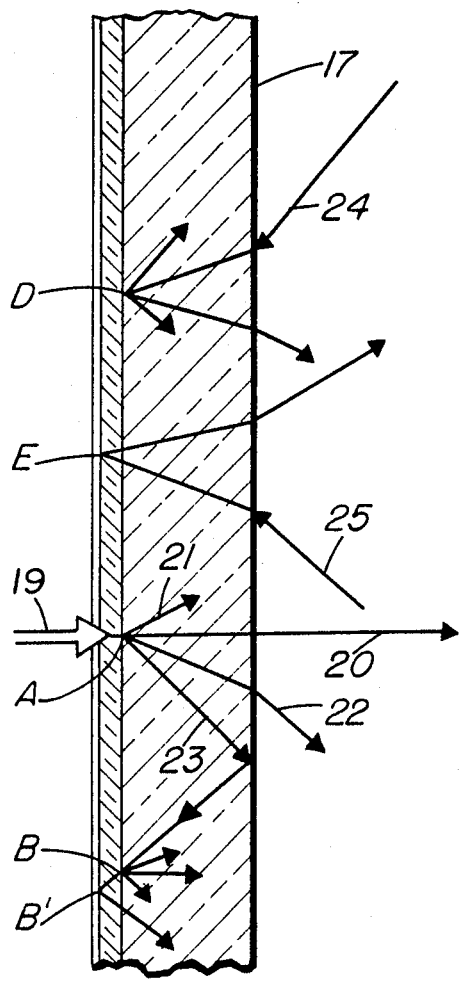
FIG. 2 illustrates schematically some of the diffusing effects of off-normal light associated with a conventional optical screen.

As seen in FIG. 2, an electron beam 19 impinges on the light-emitting layer of a conventional optical screen at point A causing a spherical emission of visible light, some components of which are shown as 20, 21, 22, and 23. In this conventional screen, only rays normal to the plane of the screen contribute to image resolution, with other components producing diffusion of the image. Moderately off-normal rays 21, 22 are refracted at the screen surface 17 to further diffuse the image.

At a sufficient angle from the normal, at the so-called critical angle, a ray 23 is internally reflected, impinges back on the phosphor layer at point B and tends to excite further emissions or simply reflect from the metal backing at point B'. This phenomenon is known as halation or "ballooning".

Similar extraneous emissions may be caused by an oblique ray 24 which is refracted at the outer surface 17 and impinges on the phosphor layer at point D, or an oblique ray 25 which simply reflects from the metal backing at point E.

Figure 3:
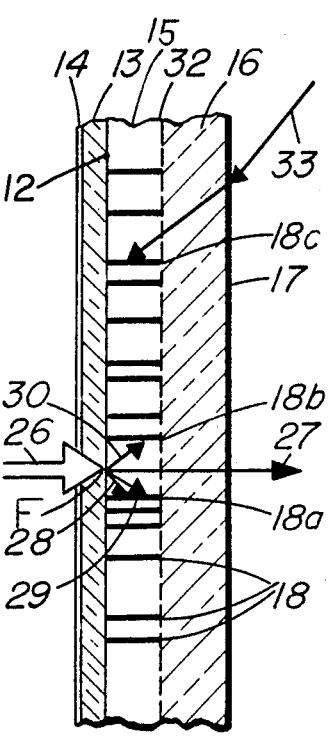
FIG. 3 is a detail from the area labeled III of FIG. 1.

The detail of the optical screen of the present invention in FIG. 3 illustrates the provision of a plurality of light-absorbing fibers having relatively high index of refraction and having a general designation 18. The fibers are disposed normally to the phosphor layer 13 and the outer surface 17 of the screen. In the embodiment of FIG. 3, the bulk of the screen consists of an outer layer 16 of conventional glass to which is fused an inner layer 15 disposed between the outer layer and the phosphor layer 13. The absorbing fibers are embedded in the inner layer 15.

The matrix of the inner layer is constituted of material having the same index of refraction and coefficient of thermal expansion as the material constituting the outer layer 16. The inner layer 15 is fused to the outer layer 16 or otherwise attached, as with carefully formulated adhesive, to assure that the interface 32 between the thick layer and the matrix is not non-reflecting and non-refracting.

The effect of the absorbing fibers 18 which lie in the plane of the cross-section can be seen in this figure. Since the fibers are uniformly distributed in the entire screen, no generality is lost by illustrating the affect on light rays in this single plane. As in a conventional display, an electron beam 26 excites the emission light from the phosphor layer at the point F. The near normal components of the emission, such as ray 27 pass undiminished through the transparent matrix of the inner layer 15 and through the outer layer 16 of the screen. Sufficiently oblique rays, 28, 29, 30, however, are seen to eventually impinge on absorbing fibers 18a, 18b and are not transmitted to the screen. The fibers are preferably formed with higher index of refraction than the surrounding material. This favors refraction of the light into the absorbing fiber rather than reflection. Thus, the inherent diffusion of the emission is reduced. Moreover, since the likelihood of a ray striking an absorbing fiber increases with the angle off the normal, few rays of greater than critical angle reach the outer surface 17. This minimizes the halation phenomenon.

A sufficiently oblique external ray, such as ray 33, even if refracted toward the normal, will strike an absorbing fiber such as 18c before reaching the phosphor layer 13, or the metal backing 14 and causing an undesired emission.

Figure 4:
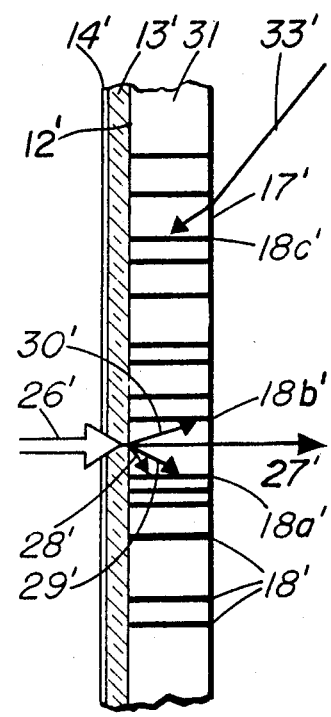
FIG. 4 is a detail analogous to FIG. 3 of a modification of the present invention.

An effect similar in kind to that described above can be achieved by an embodiment as shown in FIG. 4. There, a thick layer 31 of uniformly transparent material forms the bulk of the screen. Again, a phosphor layer 13' is provided on the inner surface 12'. However, in this embodiment the absorbing fibers 18' extend completely through the thick layer 31 to the outer surface 17' of the screen. Again, the affect of the absorbing fibers which lie in the plane of the cross-section can be seen in FIG. 4 with no generality lost. Normal or near normal rays, such as 27' pass undiminished through the screen. Sufficiently off-normal rays 28', 29', 30' strike and are absorbed by fibers 18a', 18b'.

Similarly, a sufficiently oblique external ray 33' is absorbed by fiber 18c' before the beam can either reflect off the aluminum backing 14' or excite an extraneous emission in the phosphor layer 13'.

It is apparent from a comparison between this embodiment and that of FIG. 3 that the ratio of the length of the fibers 18 to the center-to-center distance between them defines a "cone of view" for the primary phosphor emission. The optimum value for this ratio depends on the application to which the screen is to be put. Large values of the ratio give a sharper image, smaller values have less tendency to reduce the image brightness. In the latter case, a reduction in power requirements is realized.

Figure 5:
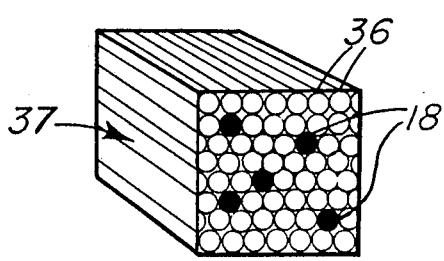
FIG. 5 illustrates the bundle-forming step in a method of manufacturing a device embodying the present invention.

One method of manufacturing either embodiment begins with a bundle of parallel unclad glass fibers 36 to which is added a small percentage of parallel black glass fibers 18. The distribution should be uniform to avoid uneven screen brightness, and random to avoid grating-type interference patterns. A magnified volume element of such a bundle 37 is shown in FIG. 5. Depending on the absorbing power of the black glass used for the fibers, about 1 to 5% by volume of black fibers is added. In actual practice about 3% black fibers were added.

Figure 6:
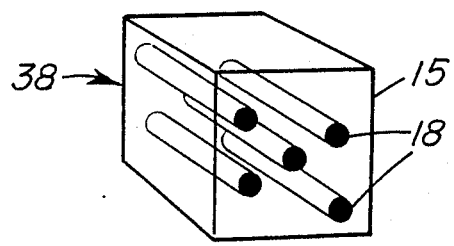
FIG. 6 illustrates the microstructure of the product formed after the first fusing step of the method.

Fibers as thin as about 1 micron will still have an image enhancing affect. Fibers as thick as 50 microns can be used without being individually discernable, which would degrade the image. The fibers in this example were about 8 microns in diameter. They were uniformly and randomly distributed in the bundle. The bundle was then fused into an integral block. A magnified volume element of such a block is shown generally as 38 in FIG. 6. The parallel black fibers 18 are seen to be embedded in the transparent glass matrix 15. To form the embodiment of FIG. 4, the block is cut thickly, in known manner, perpendicularly to the absorbing fibers. The slice is then shaped into a screen. A layer of light-emitting material and a metal backing is applied by known methods to the inner surface.

To form the embodiment of FIG. 3, a relatively thinner slice is taken from the block and fused to a thick layer of glass having the same composition as the transparent matrix. The light-emitting layer is then applied to the inner surface of the inner layer. In the latter embodiment, the thick layer is preferably one-quarter inch to three-quarters inch thick in order to achieve the strength to hold high vacuum and to maintain the required resistance to high voltage.

An inner layer with a thickness on the order of 0.05 inches (about 13 millimeters) is found to significantly enhance the image on the screen. This thickness will be adjusted along with the thickness and percentage of absorbing fibers to achieve the optimum cone of view for a particular application.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to be secured by Letters Patent is:

1. An optical display screen, comprising:
   (a) an optically-transparent matrix of material of uniform index of refraction and coefficient of thermal expansion, the matrix having inner and outer substantially parallel surfaces,
   (b) a layer of material on the inner surface adapted to be controllably induced to emit light, and
   (c) a plurality of elongated light-absorbing fibers integrally embedded in said transparent matrix, the fibers parallel to each other and aligned in a direction essentially normal to said surfaces, the matrix and fibers together constituting a transparent layer.

2. Display screen as recited in claim 1, wherein the total length of each of said light absorbing fibers spans substantially the entire distance from the inner to the outer surfaces.

3. Display screen as recited in claim 1, wherein said matrix is a clear glass formulation, and said fibers are of a light-absorbing glass formulation.

4. Display screen as recited in claim 1, wherein said fibers are uniformly distributed in said matrix.

5. Display screen as recited in claim 1, wherein said fibers are uniformly, randomly distributed in said matrix.

6. Display screen as recited in claim 5, wherein the total volume of said fibers constitutes on the close order of 3% of the volume of said transparent layer.

7. Display screen as recited in claim 5, wherein said fibers constitute from about 1% to about 5% by volume of the transparent layer.

8. Display screen as recited in claim 7, wherein the average diameter of said fibers is from about 1 micron to about 50 microns.

9. Display screen as recited in claim 7, wherein said fibers are drawn to an average diameter on the order of 8 microns.

10. An optical display screen, comprising:
    (a) an outer layer of uniformly optically transparent material, having inner and outer substantially parallel surfaces,
    (b) an inner layer comprising a matrix of optically-transparent material having uniform index of refraction and coefficient of thermal expansion and a plurality of elongated, light-absorbong fibers integrally embedded in said matrix, the fibers being parallel to each other and aligned in a direction essentially normal to the outer surface of said outer layer, said inner layer having an inner surface, and
    (c) a layer of material on the inner surface of the inner layer, adapted to be controllably induced to emit light.

11. Display screen as recited in claim 10, wherein said outer layer and the matrix of said inner layer are formulated of glass having essentially identical composition; and said fibers are formulated of light-absorbing glass.

12. Display screen as recited in claim 10, wherein said fibers are uniformly distributed in said matrix.

13. Display screen as recited in claim 10, wherein said fibers are uniformly, randomly distributed in said matrix.

14. Display screen as recited in claim 10, wherein said outer layer and the matrix of said inner layer have the same indices of refraction.

15. Display screen as recited in claim 14, wherein said outer layer and the matrix of said inner layer have the same coefficient of thermal expansion.

16. Display screen as recited in claim 10, wherein the total volume of said fibers constitutes from about 1% to about 5% of the volume of said inner layer.

17. Display screen as recited in claim 16, wherein the total volume of said fibers constitutes on the close order of 3% of the volume of said inner layer.

18. Display screen as recited in claim 17, wherein said fibers are drawn to an average diameter of from about 1 micron to about 50 microns.

19. Display screen as recited in claim 18, wherein said fibers are drawn to an average diameter on the order of 8 microns.

20. Method of forming an image enhancing optical display screen, comprising the steps of:

(a) uniformly distributing a small percentage of light-absorbing fibers among unclad transparent fibers of uniform index of refraction to form a bundle,
(b) fusing said bundle into a block comprising a uniformly transparent matrix with parallel light-absorbing fibers integrally embedded in the matrix,
(c) cutting a slice from said block perpendicular to said fibers,
(d) shaping the slice into the form of an optical display screen, the screen having an inner surface, and
(e) applying a layer of material adapted to be controllably induced to emit light to the inner surface of said screen.

21. Method as recited in claim 20, further comprising the steps of:
(f) after cutting the slice from said block, fusing the slice to a thick layer of material having essentially the same composition as the transparent matrix of the slice, the slice and the layer thereby forming an integral screen having an inner surface formed by the exposed surface of the slice bearing the absorbing fibers, and
(g) applying a layer of material adapted to be controllably induced to emit light to the inner surface of said integral screen.

* * * * *